Patented Aug. 13, 1935

2,011,386

UNITED STATES PATENT OFFICE 2,011,386

SEPARATION OF WEAK GASEOUS ACIDS FROM GASES

Heinrich Ulrich, Heinrich Dehnert, and Friedrich August Fries, Ludwigshafen - on - the - Rhine, Germany, assignors to I. G. Farbenindustrie Aktiengesellschaft, Frankfort - on - the - Main, Germany No Drawing. Application March 23, 1934, Serial No. 717,078. In Germany March 29, 1933

2 Claims. (Cl. 23—2)

The present invention relates to the separation of weak gaseous acids from gases or gas mixtures containing the same.

The separation and recovery of weak gaseous acids, such as carbon dioxide and hydrogen sulphide, from gases or gas mixtures containing the same may be effected by washing with liquids and expelling from these by heating. For the said purpose it has proved advantageous to employ washing solutions which contain organic compounds, such as amino acids or phenols, in admixture or in combination with basic alkali metal or alkaline earth metal compounds. Especially suitable are the aqueous solutions of alkali metal salts of glycocoll, alanine and taurine. The absorbed gases may be expelled again from the said liquids by boiling or by treatment with steam, the absorptive power of the solutions being regenerated at the same time.

We have now found that it is of special advantage to employ for the separation of weak gaseous acids, such as carbon dioxide and hydrogen sulphide, from gases, such liquids as contain salts of alkali-forming metals i. e. alkali metal or alkaline earth metal salts, of amino-carboxylic or aminosulphonic acids which form alkali metal salts readily soluble in water and which have the constitution:—

in which $R_1$ and $R_2$ are alkyl, hydroxyalkyl, aralkyl or aryl groups, $R_3$ is an organic radicle combined with a carboxylic or sulphonic acid radicle and $R_2$ may also be hydrogen or an organic radicle bearing a second acid radicle. The following acids may be mentioned by way of example:—N-monohydroxyethylglycocoll, N-monoethylglycocoll, N-diethylglycocoll, N-monoethylaminosuccinic acid, N-mono-hydroxyethylalanine, N-monomethyltaurine, N-monoethyltaurine, hydroxyethyl-imino-dipropionic acid, N-monopropanediolaminoacetic acid, methyl-imino-ditaurine and dimethyl-N-anthranilic acid. Of the said substances, those in which the amino groups are substituted by hydroxylated alkyl radicles are especially suitable. The said N-substituted compounds have the advantage that on the one hand the gases may be readily expelled from the solutions, which means but a slight expenditure of time and heat energy, and that on the other hand the washing solutions regenerated in the said manner retain their original absorptive power practically unchanged even after repeated use.

The said N-substituted amino acids are readily obtainable by known methods.

The following examples will further illustrate the nature of this invention but the invention is not restricted to these examples.

Example 1

A 40 per cent aqueous solution of the sodium salt of N-monohydroxyethylglycocoll is shaken for 20 minutes at room temperature and atmospheric pressure in an atmosphere of carbon dioxide. The solution is then heated for 30 minutes in an oil-bath heated to 130° C., the carbon dioxide and some water vapor thus escaping. Water is then added to reproduce a 40 per cent solution. If carbon dioxide be allowed to act again on the solution, and then expelled from it again, it is found that the absorptive power of the solution is practically unchanged. The same is true when employing a 40 per cent solution of N-dihydroxyethylglycocoll sodium salt.

The following tables show clearly that the good action of N-substituted amino acids is retained even after use for long periods. The tables show the amount absorbed by 1 molecular proportion of the 40 per cent solution concerned.

N-monohydroxyethylglycocoll sodium salt, 40 per cent solution

| | Molecular proportion of carbon dioxide |
|---|---|
| 1st absorption, amount absorbed | 0.64 |
| 2nd absorption, amount absorbed | 0.58 |
| 3rd absorption, amount absorbed | 0.62 |
| 4th absorption, amount absorbed | 0.59 |
| 5th absorption, amount absorbed | 0.58 |

N-dihydroxyethylglycocoll sodium salt, 40 per cent solution

| | Molecular proportion of carbon dioxide |
|---|---|
| 1st absorption, amount absorbed | 0.83 |
| 2nd absorption, amount absorbed | 0.79 |
| 3rd absorption, amount absorbed | 0.78 |
| 4th absorption, amount absorbed | 0.78 |
| 5th absorption, amount absorbed | 0.77 |
| 6th absorption, amount absorbed | 0.78 |

Example 2

If a 24.8 per cent aqueous solution of the sodium salt of N-methyltaurine be shaken in an atmosphere of carbon dioxide and regenerated as described in Example 1, the solution has a constant absorption on repeated employment as may be seen from the following table in which the amount absorbed by 1 molecular proportion of the solution is given:

| | Amount absorbed |
|---|---|
| 1st absorption | 0.95 molecular proportion of $CO_2$ |
| 2nd absorption | 0.94 molecular proportion of $CO_2$ |
| 3rd absorption | 0.88 molecular proportion of $CO_2$ |
| 4th absorption | 0.95 molecular proportion of $CO_2$ |
| 5th absorption | 0.91 molecular proportion of $CO_2$ |
| 6th absorption | 0.91 molecular proportion of $CO_2$ |

*Example 3*

A gas mixture having the composition of coke oven gas and containing per cubic meter 8.5 grams of hydrogen sulphide and 20 grams of carbon dioxide is scrubbed at ordinary room temperature in counter-current with an aqueous solution of 40 per cent strength of a mixture of 2 parts of the sodium salt of mono-hydroxyethyl-glycocoll and 1 part of the sodium salt of di-hydroxyethyl-glycocoll. The gas is obtained practically free from carbon dioxide and hydrogen sulphide. The washing liquid is regenerated by a short treatment with superheated steam, whereby the absorbed gases are expelled, and may then be used again for the scrubbing operation.

What we claim is:—

1. The process of removing a weak gaseous acid from a gas containing the same which comprises scrubbing said gas with a liquid containing an alkali metal salt of an acid capable of forming alkali metal salts readily soluble in water and corresponding to the formula

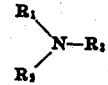

in which $R_1$ indicates a hydroxyalkyl group, $R_3$ is an organic radicle containing a carboxylic or sulphonic acid group, and $R_2$ indicates hydrogen or a hydroxyalkyl group or an organic radicle containing a carboxylic or sulphonic acid group.

2. The process of removing a weak gaseous acid from a gas containing the same which comprises scrubbing said gas with a liquid containing an alkali metal salt of an acid corresponding to the formula

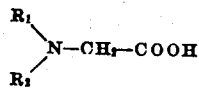

in which $R_1$ is hydroxyethyl and $R_2$ indicates hydrogen or hydroxyethyl.

HEINRICH ULRICH.
HEINRICH DEHNERT.
FRIEDRICH AUGUST FRIES.